(12) United States Patent
Mohan et al.

(10) Patent No.: US 8,972,613 B2
(45) Date of Patent: Mar. 3, 2015

(54) SYSTEM AND METHOD FOR INCREASING INPUT/OUTPUT THROUGHPUT IN A DATA STORAGE SYSTEM

(75) Inventors: Rupin T. Mohan, Northborough, MA (US); Travis Pascoe, Boise, ID (US); George Shin, Boise, ID (US); Aithal Basrur Girish, Karnataka (IN); Kasthurirengan Karthigeyan, Karnataka (IN); Unnikrishnan Ponnan Katangot, Karnataka (IN); Julio Valladares, Harvard, MA (US); Shrinivas B. Kulkarni, Karnataka (IN); Y. Ravindra Paramashivappa, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 264 days.

(21) Appl. No.: 11/590,615

(22) Filed: Oct. 31, 2006

(65) Prior Publication Data

US 2008/0147920 A1 Jun. 19, 2008

(51) Int. Cl.
 *G06F 3/06* (2006.01)
 *G06F 3/00* (2006.01)
 *G06F 12/00* (2006.01)
 *G06F 13/00* (2006.01)

(52) U.S. Cl.
 CPC ............ *G06F 3/0659* (2013.01); *G06F 3/0613* (2013.01); *G06F 3/0635* (2013.01); *G06F 3/0689* (2013.01)
 USPC ............ 710/5; 710/1; 710/8; 710/36; 710/37; 710/38; 711/100; 711/111; 711/112; 711/114; 711/154

(58) Field of Classification Search
 None
 See application file for complete search history.

(56) References Cited

U.S. PATENT DOCUMENTS

| | | | | |
|---|---|---|---|---|
| 4,342,079 A | * | 7/1982 | Stewart et al. | 711/5 |
| 5,155,845 A | * | 10/1992 | Beal et al. | 714/6 |
| 5,937,428 A | | 8/1999 | Jantz | |
| 6,098,114 A | | 8/2000 | Mcdonald | |
| 6,105,118 A | | 8/2000 | Maddalozzo | |
| 6,141,707 A | | 10/2000 | Halligan | |
| 6,145,028 A | | 11/2000 | Shank | |
| 6,237,063 B1 | | 5/2001 | Bachmat | |
| 6,301,625 B1 | | 10/2001 | Mcdonald | |
| 6,363,462 B1 | * | 3/2002 | Bergsten | 711/162 |
| 6,487,634 B1 | | 11/2002 | Bachmat | |
| 6,601,138 B2 | | 7/2003 | Otterness | |
| 6,643,735 B2 | | 11/2003 | Rodriguez | |
| 6,708,237 B1 | * | 3/2004 | Bridge | 710/39 |

(Continued)

OTHER PUBLICATIONS

C. Leangsuksun, V.K. Munganuru, T. Liu, S.L. Scott, and C. Engelmann, Asymmetric Active-Active High Availability for High-end Computing, Mathematical, Information, and Computational Sciences Division, Office of Advanced Scientif Computing Research, U.S. Department of Energy.

*Primary Examiner* — Tanh Nguyen
(74) *Attorney, Agent, or Firm* — Fletcher Yoder

(57) ABSTRACT

There is provided a system and a method for increasing input/output ("I/O") throughput in a data storage system. More specifically, in one embodiment, there is provided a method comprising determining an owning controller associated with each of a plurality of storage units of a storage system, receiving an I/O transaction for one of the plurality of storage units, determining if the I/O transaction is a read transaction, and selecting a path to the owning controller associated with the storage unit if the I/O transaction is a read transaction.

18 Claims, 2 Drawing Sheets

(56) References Cited

U.S. PATENT DOCUMENTS

| | | |
|---|---|---|
| 6,775,739 B1 | 8/2004 | Bachmat |
| 6,883,064 B2 | 4/2005 | Yoshida |
| 6,941,396 B1 * | 9/2005 | Thorpe et al. .................. 710/74 |
| 6,954,881 B1 | 10/2005 | Flynn |
| 6,983,396 B2 | 1/2006 | Brant |
| 7,076,510 B2 | 7/2006 | Brown |
| 7,093,043 B2 | 8/2006 | Tan |
| 2008/0005470 A1 * | 1/2008 | Davies .......................... 711/114 |

* cited by examiner

SYSTEM AND METHOD FOR INCREASING INPUT/OUTPUT THROUGHPUT IN A DATA STORAGE SYSTEM

BACKGROUND

This section is intended to introduce the reader to various aspects of art, which may be related to various aspects of the present invention that are described and claimed below. This discussion is believed to be helpful in providing the reader with background information to facilitate a better understanding of the various aspects of the present invention. Accordingly, it should be understood that these statements are to be read in this light, and not as admissions of prior art.

Computer usage has increased dramatically over the past few decades. With the advent of standardized architectures and operating systems, computers have become virtually indispensable for a wide variety of uses from business applications to home computers. In fact, for some businesses, a loss of computer data can result in severe financial penalties for the business (e.g., loss of customers, bad publicity, and so-forth).

For this reason, many businesses now employ data back-up or data protector systems to ensure that a hardware failure (e.g., a broken storage unit) does not result in lost data. One of these back-up systems is known as mirroring. In mirroring, also known as RAID 1, every bit of data is written to two separate and independent storage units. In this way, if one of the devices is damaged, no data is lost because identical data is stored on the "mirror" device. As can be appreciated, however input/output ("I/O") throughput (e.g., retrieving and storing data) with two separate mirrored storage units can be slower than the I/O throughput with a single storage unit.

Improving the I/O throughput to a mirrored storage system would be desirable.

DETAILED DESCRIPTION

Figure 1:
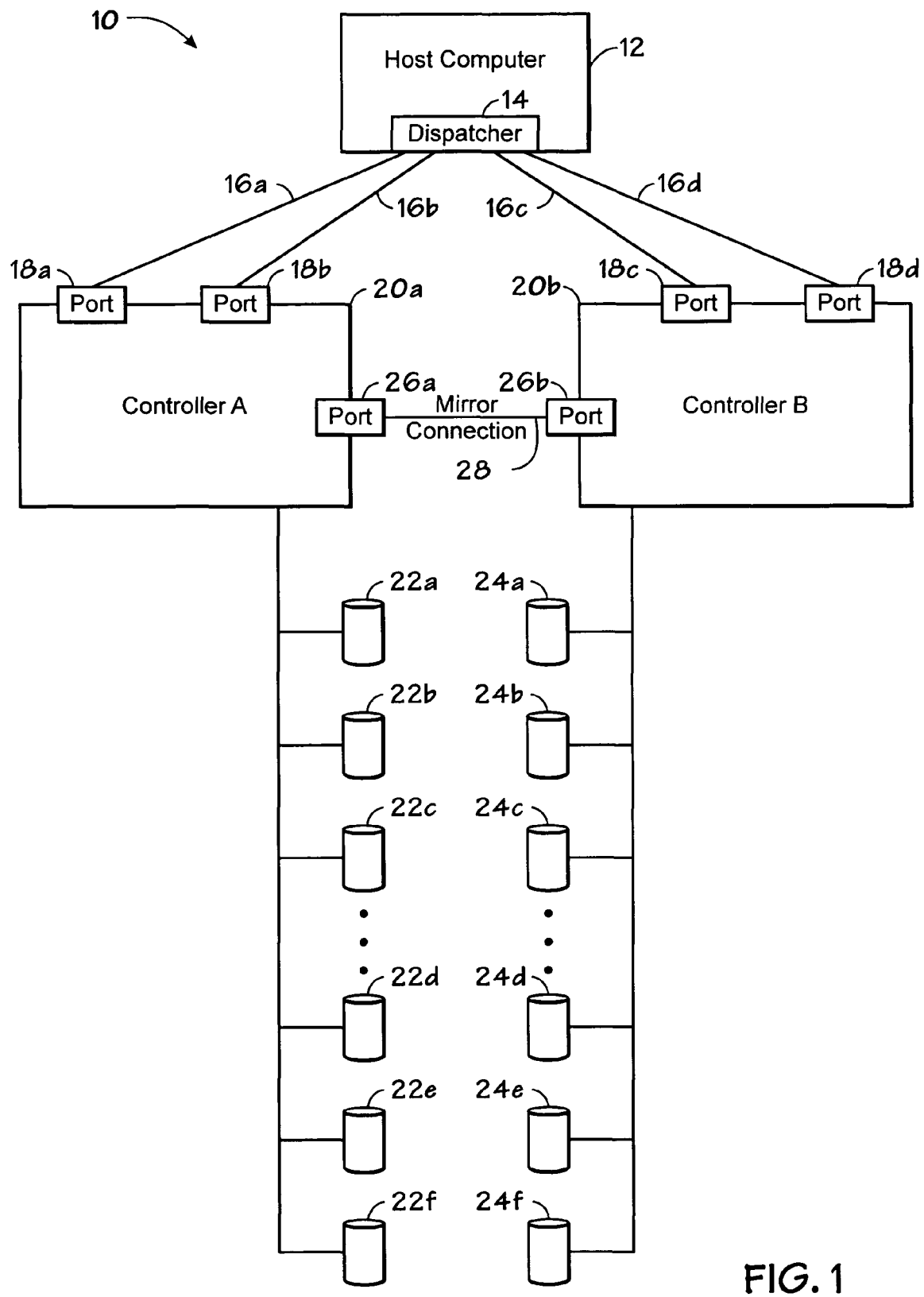
FIG. 1 is a block diagram of an exemplary data storage system configured for increased I/O throughput in accordance with one embodiment of the present invention.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As described above, mirrored back-up system may store data in two locations: a primary storage location (such as a storage unit) and a back-up (or mirror) storage location. Many of these mirrored back-up systems, however, only read data from the primary storage location unless there is a problem with the primary storage location and the back-up storage location is needed. In one embodiment of this type of back-up system, a plurality of storage location may be subdivided amongst two storage unit controllers (referred to in FIG. 1 as controller A and controller B). Typically, in this configuration, each storage location is assigned to one or the storage unit controllers has a corresponding storage location (its mirror) assigned to the other controller.

However, because only the primary storage locations are typically read, in one embodiment, the primary storage locations may be balanced between the two controllers with one of the controllers having roughly half of the primary storage location, while the other controller has roughly the other half of the primary storages location. In this way, read transactions may be split between the two storage unit controllers. It will be appreciated that the primary/back-up distinction is not as significant for write transactions, because, unlike read transactions, write transactions are performed on both the primary storage location and its mirror. Moreover, it will be appreciated that in other embodiments, the primary storage location may be split using other techniques or may be assigned to a single controller.

One type of storage system that may operate as described above is known as an asymmetric active/active storage system. In a conventional asymmetric active/active storage system, a host computer (such as host computer 12 illustrated in FIG. 1) is configured to ignore the distinction between primary and mirrored storage location and to send both read and write transactions to either controller based on an appropriate load balancing scheme (I/O response time, shortest queue depth, round robin, and so-forth). If the transaction is a write transaction, the receiving controller would execute the write transaction and then transmit the write transaction to the other controller to also perform the write transaction. If, however, the transaction is a read transaction, the controller receiving the transaction would first determine whether the read transaction involved one of its primary storage locations. If the transaction does involve one of that controller's primary storage locations, the controller would execute the read transaction. If the transaction does not involve one of that controller's primary storage locations, the controller would transmit the read transaction to the other controller for execution. This retransmission may be referred to as a "proxy read."

As can be appreciated, a significant percentage of the time, the load balancing scheme of the host computer will not direct read transactions to the correct controller (known as the owning controller of the primary storage unit or as the "optimized" path in SCSI-based systems) and extra cycle time may be lost transmitting the read transaction to the other controller. For example, proxy reads may generate system demerits. Accordingly, one or more of the embodiments described herein may be directed towards a system or method for determining the owning controller associated with a particular read transaction and directing that read transaction to the owning controller.

Turning now to the drawings and looking first at FIG. 1, a block diagram of an exemplary data storage system configured to increase I/O throughput in accordance with one embodiment is illustrated and generally designated by reference numeral 10. In one embodiment, the storage system 10 may include a modified version of the Enterprise Virtual Array ("EVA") system produced by Hewlett-Packard Company. In another embodiment, the storage system 10 may include a modified version of the Modular Smart Array ("MSA") system produced by Hewlett-Packard Company. In still other embodiments, other suitable storage systems may be employed.

As illustrated in FIG. 1, the storage system 10 may include the host computer 12. The host computer 12 may be any one of a number of suitable personal or business computers. For example, in various embodiments, the host computer 12 may include a PC, a Macintosh compatible computer, a Unix machine, and so-forth.

The host computer 12 may be coupled to a dispatcher 14. As will be described in further detail below, the dispatcher 14 may be configured to determine an owning controller associated with a particular read transaction and to direct that read transaction to the associated owning controller. In one embodiment, the host computer 12 may include the dispatcher 14. However, in alternate embodiments, the dispatcher 14 may be external to the host computer 12.

As shown in FIG. 1, the dispatcher 14 may be coupled to one or more channels 16a, 16b, 16c, and 16d (hereafter referred to as "16a-d"). The channels 16a-d may include any suitable form of computer or electronic interconnect. For example, in one embodiment, the channel 16a-d may be Fibre channels. In alternate embodiments, however, the channels 16a-d may include a Peripheral Component Interface ("PCI") bus, a Small Computer Systems Interface ("SCSI") bus, an Ethernet or gigabit Ethernet connection, or other suitable interconnect technology.

The channels 16a-d may be connected to ports 18a, 18b, 18c, and 18d (hereafter referred to as "18a-d") respectively. The ports 18a-d may be configured to receive and relay data received from the channels 16a-d into controller 20a and 20b. As such, the ports 18a-d are compatible with the channels 16a-d. For example, if the channels 16a-d are Fibre channels, the ports 18a-d may comprise Fibre ports.

As shown, the ports 18a-d may be coupled to or integrated into storage unit controllers 20a and 20b (illustrated in FIG. 1 as controller A and controller B, respectively). In particular, ports 18a and 18b may be coupled to controller A and ports 18c and 18d may be coupled to controller B. As will be appreciated, the controllers 20a and 20b may be configured to control the flow of data to and from a plurality of storage units. For example, in the embodiment illustrated in FIG. 1, the controller 20a may be configured to control storage units 22a, 22b, 22c, 22d, 22e, and 22f (hereafter referred to as "22a-f"). Similarly, the controller 20b may be configured to control storage units 24a, 24b, 24c, 24d, 24e, and 24f (hereafter referred to as "24a-f"). Although each of the controllers 20a and 20b are illustrated in FIG. 1 as controlling six storage units 22 and 24, it will be appreciated, as indicated by the ellipsis in FIG. 1, that any suitable number of storage units 22 and 24 may be employed. For example, in one embodiment, the controllers 20a and 20b may each control a single storage unit 22 and 24 or in other embodiments, the controllers 20a and 20b may control ten or more storage units 22 and 24.

Although not illustrated in FIG. 1, those of ordinary skill in the art will appreciate that each of the controllers 20a and 20b may include one or more processors, cache, memory, and/or other appropriate hardware, firmware, or software appropriate for controller the storage units 22 and 24. For example, in one embodiment, the controllers 20a and 20b may be EVA Hierarchical Storage Virtual Controllers Model 210 produced by Hewlett Packard Company. In alternate embodiments, however, other suitable controllers 20a and 20b may be employed in the system 10.

In addition, the controllers 20a and 20b may also include mirror ports 26a and 26b, respectively. As described above, the controllers 20a and 20b may be configured to transmit write instructions between each other to enable write transactions to be performed on both a primary storage unit and its mirror storage unit. Accordingly, controllers 20a and 20b may include the ports 26a and 26b as well as mirror connection 28 to enable this inter-controller communication. In one embodiment, the ports 26a and 26b may be similar to the ports 18a-d and the mirror connection 28 may be similar to the channels 16a-d. However, in alternate embodiments, other suitable port types and/or interconnect types, as described above with regard to the channels 16a-d and the ports 18a-d, may be employed to interconnect the controllers 20a and 20b.

As described above, the controllers 20a and 20b may be coupled to one or more storage units 22a-f and 24a-f. In various embodiments, the storage units 22a-f and 24a-f may include any one of a number of suitable data storage units. For example, in one embodiment, the storage units 22 and 24 may include hard drives or other magnetic storage devices. However, in alternate embodiments, the storage units 22 and 24 may include optical storage devices, solid state storage devices, such as memories, or other suitable types of data storage device. Moreover, it will be appreciated that the storage units 22a-f and 24a-f may be physical storage devices, logical storage units, or some combination thereof. More specifically, in one embodiment, one or more of the storage devices 22a-f and 24a-f may include logical storage units ("LUs") or logical storage volumes partitioned from one or more physical hard disk devices. For example, in one embodiment, the storage units 22 and 24 illustrated in FIG. 1 may represent a logical view of individual ports on a physical disk drive. More specifically, in this embodiment, storage units 24a and 24b may be two ports on the same physical storage device.

Figure 2:
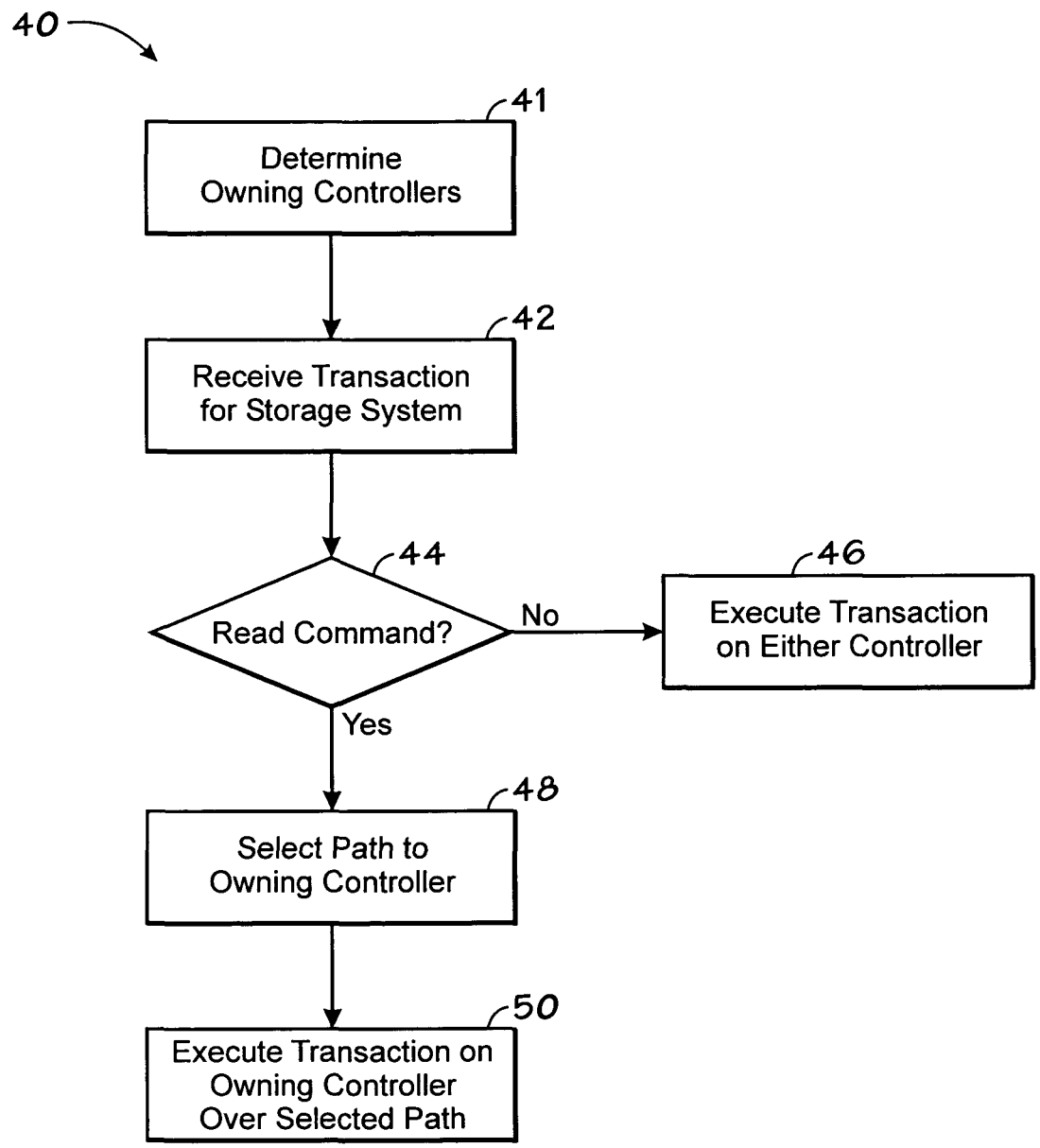
FIG. 2 is a flowchart illustrating an exemplary technique for increasing I/O throughput in a data storage system in accordance with one embodiment of the present invention.

As described above, the storage system 10 may be configured to determine an owning controller associated with a particular read transaction and then to direct that read transaction to the owning controller. Accordingly, FIG. 2 is a flowchart illustrating an exemplary technique 40 for increasing I/O throughput in a data storage unit by directing read transactions to the appropriate owning controller. In one embodiment, the technique 40 may be executed by the dispatcher 14 within the storage system 10.

As illustrated by block 41 of FIG. 2, the technique 40 may begin by determining the owning controller for each of the storage units 22a-f and 24a-f as indicated by block 48. In one embodiment, determining the owning controller includes sending a REPORT TARGET PORT GROUPS SCSI command to each of the storage units 22a-f and 24a-f and/or along each of the channels 16a-d.

Next, the technique 40 may include receiving a transaction for the storage system, as indicated by block 42. This received transaction may be generated by the host computer 12, by another computer coupled to the host computer 12, and/or any other suitable source in communication with the controllers 20a and 20b. After receiving a transaction for the storage system, the technique 40 may include determining whether the received transaction is a read transaction, as indicated by block 44. If the transaction is not a read transaction (e.g., it is a write transaction), the dispatcher may send the transaction to either the controller 20a or 20b via any of the channels 16a-d. In one embodiment, the dispatcher 14 determines the appropriate controller 20a and 20b and appropriate channel 16a-d using a load balancing algorithm, such as I/O response time, shortest queue depth, round robin, and the like.

If, on the other hand, the transaction is a read transaction, the technique 40 may include selecting a path to the owning controller, as indicated by block 48. In one embodiment, selecting a path to the owning controller may comprise selecting one of a plurality of ports and/or channels to the owning controller. For example, if the owning controller were the controller 20a, the dispatcher 14 may select between the channel 16a and 16b in determining a path to the controller 20a, which is the owning controller. In one embodiment, the dispatcher 14 may be configured to select between one or more available ports using any one of a number of suitable load balancing algorithms, such as I/O response time, shortest queue depth, round robin, and the like.

After selecting a path to the owning controller, the technique 40 may include executing the received read transaction on the owning controller over the selected path. In this way, the technique 40 enables read transactions to be directly routed to the owning controller. Advantageously, such direct routing may decrease response time for read transactions to the storage system 10, and, thus, increase the overall throughput of the storage system 10. Moreover, the technique 40 may reduce inter-controller communication between the controllers 20a and 20b over the mirror connection 28, which may also increase the I/O throughput of the storage system 10.

While the invention described above may be susceptible to various modifications and alternative forms, specific embodiments have been shown by way of example in the drawings and have been described in detail herein. It should be understood, however, that the invention is not intended to be limited to the particular embodiments disclosed.

What is claimed:

1. A method to process input/output (I/O) transactions in a storage system having a plurality of storage units, comprising:
   determining an owning controller configured to directly control only a subset of the plurality of storage units;
   receiving an I/O transaction for a particular one of the plurality of storage units;
   determining if the I/O transaction is a read transaction; and
   if the I/O transaction is a read transaction:
      identifying, using a dispatcher, the owning controller of the particular one of the plurality of storage units as the only controller to dispatch the I/O read transaction to, wherein the particular one of the plurality of storage units is the primary storage unit for the I/O read transaction; and
      selecting a path from the dispatcher to the owning controller, wherein selecting the path to the owning controller comprises selecting a path to the owning controller from a plurality of available paths to the owning controller; and
   if the I/O transaction is not a read transaction, selecting a path from the dispatcher to a non-owning controller.

2. The method, as set forth in claim 1, further comprising:
   transmitting the I/O read transaction to the owning controller; and
   executing the I/O read transaction on the owning controller.

3. The method, as set forth in claim 2, wherein executing the I/O read transaction comprises directing the I/O read transaction to the particular one of the plurality of storage units, wherein the particular one of the plurality of storage units is a primary storage unit associated with the owning controller.

4. The method, as set forth in claim 2, wherein executing the I/O read transaction comprises executing the I/O read transaction on the owning controller without processing the I/O read transaction on a non-owning controller.

5. The method, as set forth in claim 1, wherein selecting the path to the owning controller comprises selecting a path using a load balancing scheme.

6. The method, as set forth in claim 1, wherein determining the owning controller comprises determining the owning controller in a mirrored storage system.

7. A storage system comprising:
   a plurality of storage units including primary storage units and back-up storage units;
   a first controller configured to directly control only a first subset of the plurality of storage units;
   a second controller configured to directly control only a second subset of the plurality of storage units;
   a dispatcher coupled to the first controller and the second controller, wherein the dispatcher is configured to:
      determine an owning controller configured to directly control a particular one of the plurality of storage units of the storage system;
      receive an I/O transaction for the particular one of the plurality of storage units;
      determine if the I/O transaction is a read transaction; and
      if the I/O transaction is a read transaction:
         identify, using the dispatcher, the owning controller of the particular one of the plurality of storage units as the only controller to dispatch the I/O read transaction to, wherein the particular one of the plurality of storage units is the primary storage unit for the I/O read transaction; and
         select a path from the dispatcher to the owning controller, wherein the selection of the path to the owning controller comprises selecting a path to the owning controller from a plurality of available paths to the owning controller; and
      if the I/O transaction is not a read transaction, select a path from the dispatcher to a non-owning controller.

8. The storage system, as set forth in claim 7, wherein the dispatcher selects one of a plurality of ports to the owning controller.

9. The storage system, as set forth in claim 8, wherein the dispatcher determines the particular one of the plurality of storage units as a primary storage unit associated with the owning controller.

10. The storage system, as set forth in claim 9, wherein the dispatcher determines the primary storage unit associated with the I/O read transaction by executing a REPORT TARGET PORT GROUPS command.

11. The storage system, as set forth in claim 7, further comprising a fibre channel connection, wherein the fibre channel connection is coupled to the first controller.

12. The storage system, as set forth in claim 7, wherein the dispatcher transmits the I/O read transaction over the selected path to the owning controller.

13. The storage system, as set forth in claim 7, wherein the dispatcher selects the path to the owning controller based on a load balancing scheme.

14. The storage system, as set forth in claim 7, wherein the back-up storage units comprise mirrors of the primary storage units.

15. The storage system, as set forth in claim 7, wherein the storage system comprises an asymmetric active/active storage system.

16. A non-transitory machine-readable medium comprising:
   code adapted to determine an owning controller configured to directly control only a subset of a plurality of storage units of a storage system;
   code adapted to receive an I/O transaction for a particular one of the plurality of storage units;
   code adapted to determine if the I/O transaction is a read transaction; and
   code adapted to, if the I/O transaction is a read transaction:
      identify, using a dispatcher, the owning controller of the particular one of the plurality of storage units as the only controller to dispatch the I/O read transaction to, wherein the particular one of the plurality of storage units is the primary storage unit for the I/O read transaction; and select a path from the dispatcher to the owning controller, wherein the selection of the path to the owning controller comprises selecting a path to the owning controller from a plurality of available paths to the owning controller; and code adapted to, if the I/O transaction is not a read transaction, select a path from the dispatcher to a non-owning controller.

17. The non-transitory machine-readable medium of claim 16, comprising: code adapted to transmit the I/O read transaction to the owning controller; and code adapted to execute the I/O read transaction on the owning controller.

18. The non-transitory machine-readable medium, as set forth in claim 16, comprising code adapted to execute the I/O read transaction on the owning controller of the particular one of the plurality of storage units that is associated with the I/O read transaction.

\* \* \* \* \*